UNITED STATES PATENT OFFICE.

PAUL ASKENASY, OF KARLSRUHE, GERMANY, ASSIGNOR TO AKTIENGESELLSCHAFT FÜR CHEMISCHE PRODUKTE VORMALS H. SCHEIDEMANDEL, OF BERLIN, GERMANY, A CORPORATION OF GERMANY.

METHOD OF THICKENING (CONDENSING) OR DRYING SOLUTIONS, EMULSIONS, AND THE LIKE.

1,234,714.     Specification of Letters Patent.     Patented July 31, 1917.

No Drawing.     Application filed December 12, 1916. Serial No. 136,476.

*To all whom it may concern:*

Be it known that I, Dr. PAUL ASKENASY, professor, chemist, a subject of the German Emperor, and resident of Karlsruhe, Baden, Germany, have invented new and useful Methods of Thickening (Condensing) or Drying Solutions, Emulsions, and the like, of which the following is a specification.

The present invention relates to a novel method of thickening solutions, emulsions and the like through the absorption of liquid contained therein by the addition of gelatin, glue or the like. When cakes of pulverized gelatin are placed in a liquid, such as milk, for example, a thickened deposit of the liquid is obtained, as the water contained therein will be absorbed by the gelatin. The swollen gelatin, which heretofore was only used in form of cakes, leaves or powder, however, had the disadvantage that its several particles would stick together, whereby the separation of the liquid, and in particular the drying and renewed employment of the gelatin matter was rendered difficult.

According to the present invention the gelatin is employed in form of balls, globules, beads, polyhedrons and in general of a form which is between a ball and a cube. It has been found that when gelatin of such form is used, the gelatin particles, even during the drying process, will not stick very much together.

If, for example, milk is to be condensed after the new method, fresh unskimmed milk is mixed with about ⅓ of its volume of gelatin beads of say about one-twentieth inch in diameter, and the latter are left to swell for 6 hours, the fluid being, if desirable, stirred in the mean time. If the beads are being used for the first time for the said purpose, beside the water also other substances contained in the milk, such as lactose and salt will be absorbed by the beads, so that if the beads remain a sufficient length of time in the milk the osmotic pressures of the phases will remain equal.

The beads may be separated from the thickened milk in any suitable manner. In small plants it will frequently be sufficient to pour off the thickened liquid from the beads. In many instances it will be advisable to separate the beads from the thickened liquid by centrifuging and to subsequently wash the beads in water or in fresh, not yet treated milk or whey. In other cases a rinsing of the beads with benzene, tetrachlorid of carbon and the like may be necessary.

In all cases the beads may be easily spread on a surface, they will not stick together and may be readily dried by any convenient means.

When beads are employed which have been used once in the manner described, the process will be somewhat different at such second use and at every following use. The beads contain, as said hereinbefore, lactose in a more concentrated form than the milk itself. When, therefore, the beads are repeatedly used, firstly water will diffuse into them, and lactose and the like from them until isotony is reached; then lactose will again enter and so on. The beads may, therefore, be swollen the first time in whey or the like. From the character of these processes it is obvious that milk, which has been treated in such manner, may be considered as containing, with exception of the lost water all its original components at exactly the same ratio as the original fresh milk.

For the procedure hereinbefore described the globular or bead-form of the gelatin is naturally the most favorable, because the same may be easily and cheaply manufactured, although also the other forms mentioned may be used. The contact surfaces of balls lying close together will always be smallest.

The most surprising fact is that the dried beads may be used over again a practically unlimited number of times, without their undergoing any material change in their substance or on their surface. Furthermore, even if used ever so often, they show no increased tendency to stick together, as compared with their first use. A certain quantity of beads was used for more than 30 times for treating milk or yoghurt, without, after the last drying, any mechanical change being observable.

When the gelatin is swollen at a very low temperature, for example at 6° cent., a milk will be obtained by cold process, which is condensed without any change in its ferments to the thickness of cream and of a very fine creamlike flavor, and such milk may be either used immediately, or may be preserved by the known processes. It is better digestible than condensed milk obtained by the old method. There exists no cause for fear that the quality of the milk might suffer, by its components mixing with the gelatin; this is obvious from the fact that after having been dried under the same conditions, the gelatin will after the third or the thirtieth time not differ materially in weight. For using the gelatin beads for the first time for such or similar purposes in the provisions industry, it will be advisable to swell them first in water or milk, so as to remove any flavor they might contain.

After the hereinbefore described novel method also other fluids, emulsions and the like, which cannot undergo a high temperature without changing, may be condensed, and even substances such as albumen and yolk of egg may be condensed to a solid state.

Compared with the usual manner of condensing numerous solutions and the like which had to be performed by heat, the present method affords under circumstances, many advantages. So, for example, it is possible to condense solutions of lactose, as obtained from skimmed milk after precipitation of the proteins, by cold process without the lactose being partly decomposed, as will frequently occur when condensing *in vacuo*, such decomposition of the lactose entailing considerable losses in crystallized lactose.

The beads are easily dried between galvanized or tinned wire netting, preferably in thin layers disposed in a vertical or a horizontal position, for example *in vacuo*, by air draft, by desiccation by means of liquids such as alcohol, in which gelatin is insoluble, and the like. In place of gelatin also similar substances, such as glue, isinglass and the like may be used.

The globules used according to my present invention are advantageously manufactured as described in my U. S. patent application Serial Number 56816 filed October 19th 1915 now Patent No. 1,201,132, Oct. 10, 1916.

I claim:

1. A method of thickening solutions, emulsions and the like, which comprises adding to them small substantially globular, or bead-like bodies of glue or gelatin, keeping said bodies in contact with the substance to be thickened for a time sufficient to absorb a portion of the liquid present, and then removing the beads containing the absorbed liquid whereby a thickened residue is obtained.

2. A method of thickening solutions, emulsions and the like, which comprises adding to them small substantially globular, or bead-like bodies of glue or gelatin, keeping said bodies in contact with the substance to be thickened for a time sufficient to absorb a portion of the liquid present, and then removing the beads containing the absorbed liquid whereby a thickened residue is obtained, and in subsequently drying the bodies so separated, and using them over again in a fresh solution to be thickened.

In testimony that I claim the foregoing as my invention, I have signed my name this 12th day of October A. D. 1916.

Dr. PAUL ASKENASY.